April 11, 1961 C. W. DUNNET 2,978,810
BUTTER PAT SLICER
Filed July 20, 1959
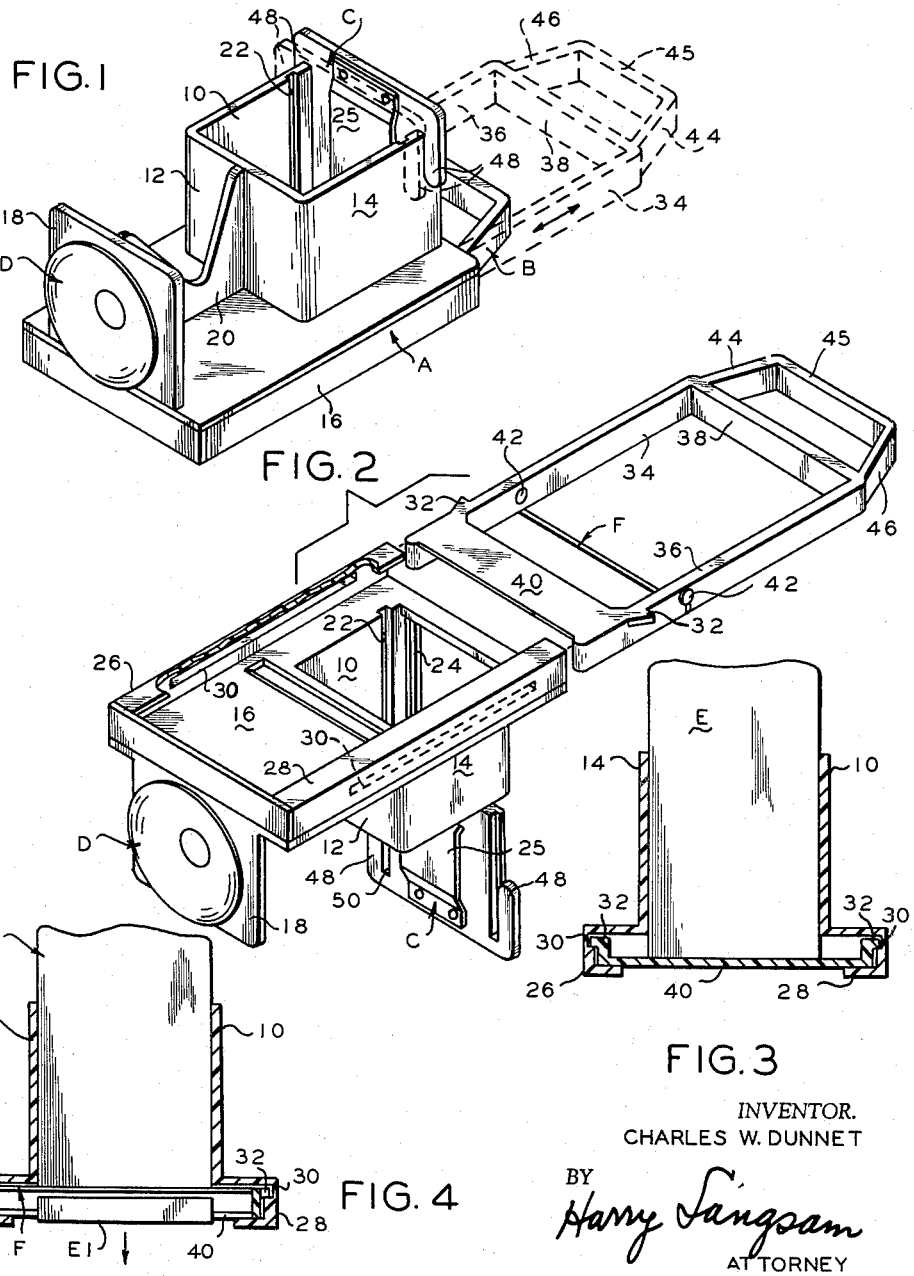
INVENTOR.
CHARLES W. DUNNET
BY
Harry Sangsam
ATTORNEY

United States Patent Office 2,978,810
Patented Apr. 11, 1961

2,978,810
BUTTER PAT SLICER

Charles W. Dunnet, 3 E. Lodges Lane, Cynwyd, Pa.

Filed July 20, 1959, Ser. No. 828,084

1 Claim. (Cl. 31—21)

My invention relates to a butter pat slicer, and more particularly relates to a hand operated butter pat slicer and holder wherein a one-quarter pound cake of butter may be stored therein and a plurality of individual butter pats sliced therefrom rapidly and efficiently without being touched by a person's hands.

This is a continuation-in-part of my previously filed application, Serial No. 738,789, filed May 29, 1958.

In the setting of a table at home, it is frequently desirable for the housewife to serve individual butter pats rather than the large one-quarter or full pound butter cakes. This practice is not only hygienic but also economical since it avoids the necessity of serving appreciable quantities of butter in excess of the needs of the family. However, it is well recognized that a housewife experiences considerable difficulty in cutting by hand by means of a knife individual butter pats which are uniform in thickness and contour and wherein the touching of the butter itself by the hands is avoided.

Therefore, it is an object of my invention to construct a butter pat dispenser which will provide sanitary service of individual butter pats cut therein.

Another object of my invention is to provide a butter pat slicer wherein a one-quarter pound cake of butter may be stored therein within a refrigerator and wherein the butter cake may be cut into a succession of uniform pats and dispensed therefrom individually.

Another object of my invention is to provide a butter pat slicer for discharging individual pats upon a plate without the necessity of the housewife touching the butter.

Another object of my invention is to provide a butter pat slicer whereby the butter cake may be stored therein during refrigeration and thereafter dispensed sanitarily even by a child.

Another object of my invention is to provide a butter pat slicer for holding a one-quarter pound cake of butter and cut therefrom individual uniform pats whenever desired.

Another object of my invention is to provide a holder for butter which is adjustable to cakes of butter of different sizes.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the folowing description, when read in conjunction with the accompanying drawing, in which:

Fig. 1 is a perspective view of a butter pat slicer embodying my invention, which is adapted to be placed upon a refrigerator door or any other surface by means of a suction cup.

Fig. 2 is a perspective view of the various elements which are illustrated in Fig. 1.

Fig. 3 is a fragmentary sectional view showing the cake of butter resting on the slide platform.

Fig. 4 is a fragmentary sectional view showing a pat of butter as it is falling after it has been sliced.

Referring now in greater detail to the drawings in which similar reference characters refer to similar parts, I show a butter pat slicer comprising a housing, generally designated as A, which is preferably made of molded material, and a slicer, generally designated as B, which is adapted to slice the butter.

The housing A is an integrally molded plastic assembly comprising a hollow, rectangular chimney or hopper having integrally formed walls 10, 12 and 14 extending from the base 16. One wall is closed by a removable member, generally designated as C. From one edge of the base 16 is a vertically extending wall member 18, to which is attached a suction cup, generally designated as D. This enables the unit to be held to a refrigerator door so that the butter can be cut after it has been removed from the refrigerator.

A supporting rib 20 extends from the wall 12 to the suction supporting wall 18. Adjacent the free edges of the wall 10 and 14 is a pair of guides 22 and 24, into which the removable wall C may be placed. The removable wall C is adapted to go into either the slots 22 or the slots 24 in order to increase or decrease the distance from the wall 12, in order to accommodate different size cakes of butter.

It should be noted that on the removable wall C is a stainless sheet of metal 25 which is fastened at one end which is for the purpose of adding a little pressure to the butter. This pressure plate 24 prevents the cake of butter from sliding too freely.

Protruding downwardly from the base 16 is a pair of supporting ledges 26 and 28 which serve as guides for the slicer B. Each of the guides 26 and 28 have a groove 30 therein for receiving complementary projections 32 on the slicer. The slicer B generally is made of molded plastic material which will not shatter upon being dropped, and it consists of side walls 34 and 36 joined at one end by a cross-piece 38 and at the other end by a platform 40. The platform 40 serves to have the cake of butter E rest thereon as shown in Fig. 3 and when a filament cutter, made of stainless steel, generally designated as F, which is held to the sides 34 and 36 by means of rivets 42, is advanced and forced through the cake of butter as the slicer B is pushed into the housing A, a butter pat E1 is severed. When the slicer B is pulled outwardly by virtue of its handle defined by the sides 44, 45 and 46, the cake of butter E falls upon the platform 40 until the user pushes the handle inwardly in the direction of the suction cup to slice another butter pat.

Since it would not be advisable to have the cake of butter free after a butter pat is sliced a pressure plate 25 holds the butter in a time delayed position until the slicer B is brought back to retain the cake of butter for the next butter pat.

It should be noted that when different size cakes of butter are used, then the user may change the position of the wall C in its proper groove 22 and 24.

It is seen that neither the butter cake E nor the butter pat E1 need ever be touched by the hands. Furthermore, the butter cake may be stored within the chimney defined by the walls 10, 12 and 14 and C, and kept under refrigeration therein. Should it be desired at any time to clean the butter pat slicer, the parts may be dipped in warm water to melt any particles of butter that may be thereon.

Although my invention has been described in considerable detail, such description is intended as being illustrative, rather than limiting, since the invention may be variously embodied, and the scope of the invention is to be determined as claimed.

I claim:

A butter pat slicing device comprising a generally rectangular base defined by oppositely disposed longitudinal side walls, an end wall at one end, and a top wall, the opposite end and the bottom of said base being open, an aperture in said top wall, an open-ended, vertical hopper extending upwardly from said aperture for holding a cake of butter, said hopper being defined by a plurality of side walls, two of said side walls being in oppositely disposed positions, said oppositely disposed side walls each having a plurality of vertical, linear grooves adjacent corresponding edges, the grooves on one of said oppositely disposed side walls being aligned with the grooves on the other of said oppositely disposed side walls, a removable side wall plate selectively positioned between corresponding aligned grooves on said oppositely disposed side walls, a spring pressure finger on the internal surface of said removable plate, oppositely disposed flanges extending toward each other from the side walls of said base, a slicing means slidable on said flanges in said base through the open end of said base, said slicing means being substantially open and defined by a generally rectangular frame adapted to slidably fit within said base, said slicing means having a handle at one end, a cutter extending transversely thereacross from one side of said frame to the opposite side thereof and a butter cake supporting ledge on at least one end thereof, and a mounting plate connected to the top wall of said base and extending upwardly therefrom in spaced, parallel relationship to said hopper, said mounting plate being provided with a suction cup.

References Cited in the file of this patent
UNITED STATES PATENTS

| | | |
|---|---|---|
| 2,285,637 | Weiler | June 9, 1942 |
| 2,471,100 | Dodge | May 24, 1949 |
| 2,613,714 | Miller | Oct. 14, 1952 |